INVENTORS
HERBERT A. GAENSBAUER
EVERETT C. ELGAR
BY James C Davis Jr.
THEIR ATTORNEY United States Patent Office 3,436,579
Patented Apr. 1, 1969

3,436,579
STATOR CORE FOR DYNAMOELECTRIC MACHINES
Herbert A. Gaensbauer and Everett C. Elgar, Peterborough, Ontario, Canada, assignors to Canadian General Electric Company Limited, Toronto, Ontario, Canada, a corporation of Canada
Filed Aug. 21, 1967, Ser. No. 662,143
Int. Cl. H02k 1/12
U.S. Cl. 310—258    4 Claims

ABSTRACT OF THE DISCLOSURE

A dynamoelectric machine stator core comprising a stack of identical laminations and having rows of axially spaced integral projections on the outer periphery thereof in the path of axial coolant flow.

Background

This invention relates to the cooling of the stator of a dynamoelectric machine, and in particular to the construction of a stator core having improved means for transferring heat from the core to the cooling air circulated over the core.

In many dynamoelectric machines, the stator is cooled by passing air over its core in direct contact with the edges of the laminations comprising the core. Since this surface is usually quite regular and smooth, the air flowing over it tends to become laminar in character as it advances along the core surface. It is well known that laminar flow leads to layers of air next to the surface that are more or less stagnant; as a result, they are poorer conductors of heat than the more turbulent air farther away from the surface. Consequently, these layers of stagnant air next to the surface act as a barrier to the transfer of heat from the surface to the cooling air.

The object of this invention is to provide means for improving the transfer of heat from a stator core to the cooling air passed over the core.

Brief summary of the invention

In a preferred embodiment of the invention a stator core comprises a stack of identical annular laminations each having four groups of projections on the outer periphery thereof. The groups are substantially equally circumferentially spaced and respectively disposed corresponding to the four scrap corners of the square sheet stock from which the lamination is punched or otherwise formed. The groups of projections each subtend an arc substantially equal to, but less than, 45 mechanical degrees.

The core includes contiguous bundles each comprising a plurality of axially aligned laminations. The core is characterized by succesive bundles being circumferentially offset from each other by approximately 45° to provide axially extending rows of spaced projections, whereby the axial coolant flow over the core periphery alternately encounters a smooth arcuate duct section and then a corresponding duct section partially occluded by circumferentially spaced flow-disturbing projections.

Brief description of the several views of the drawing

In order that the invention may be more readily understood, the description to follow will refer to the accompanying drawings, in which.

Detailed description

Figure 1:
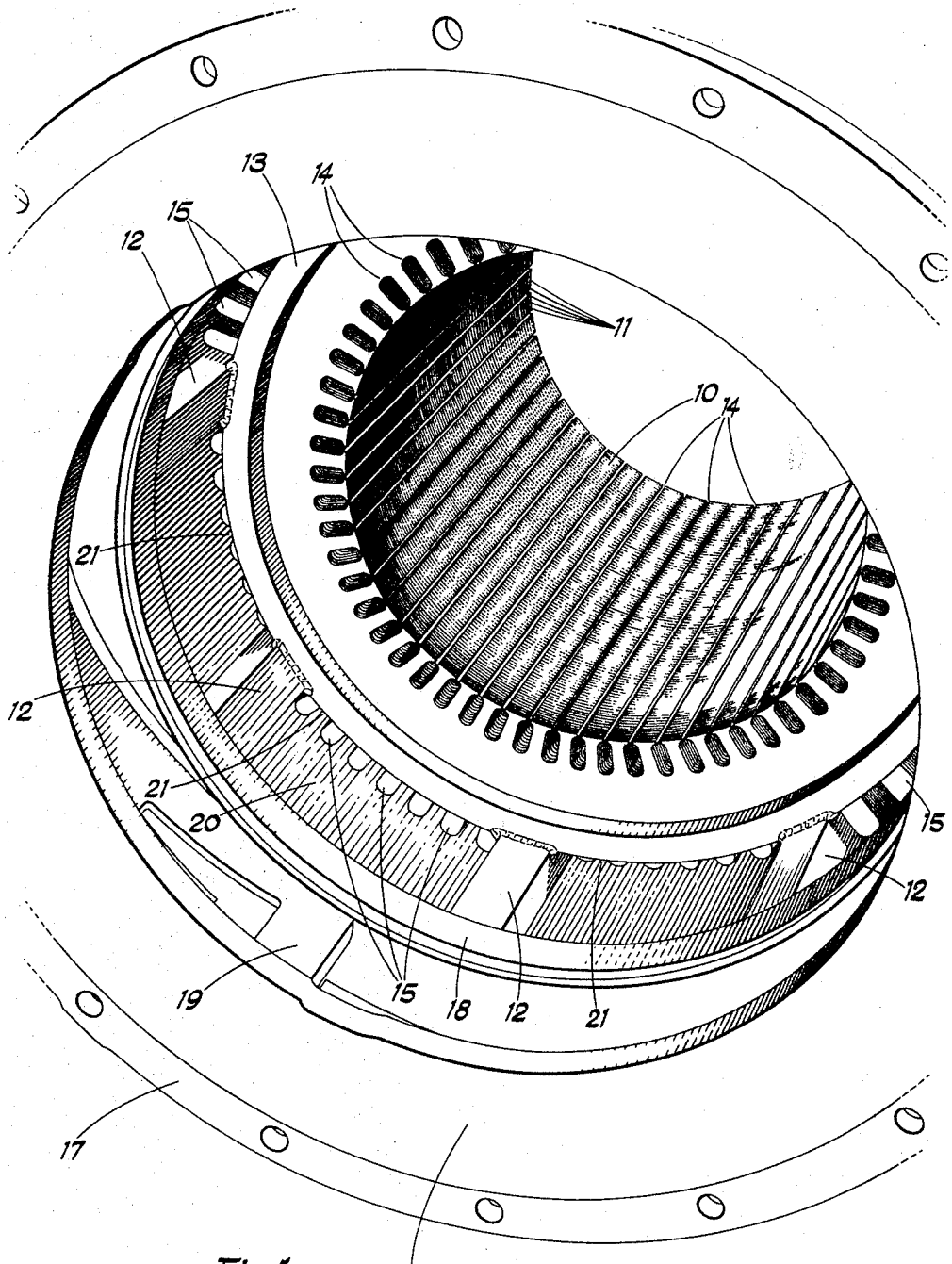
FIGURE 1 is a view in perspective of a stator incorporating the invention.
Figure 2:
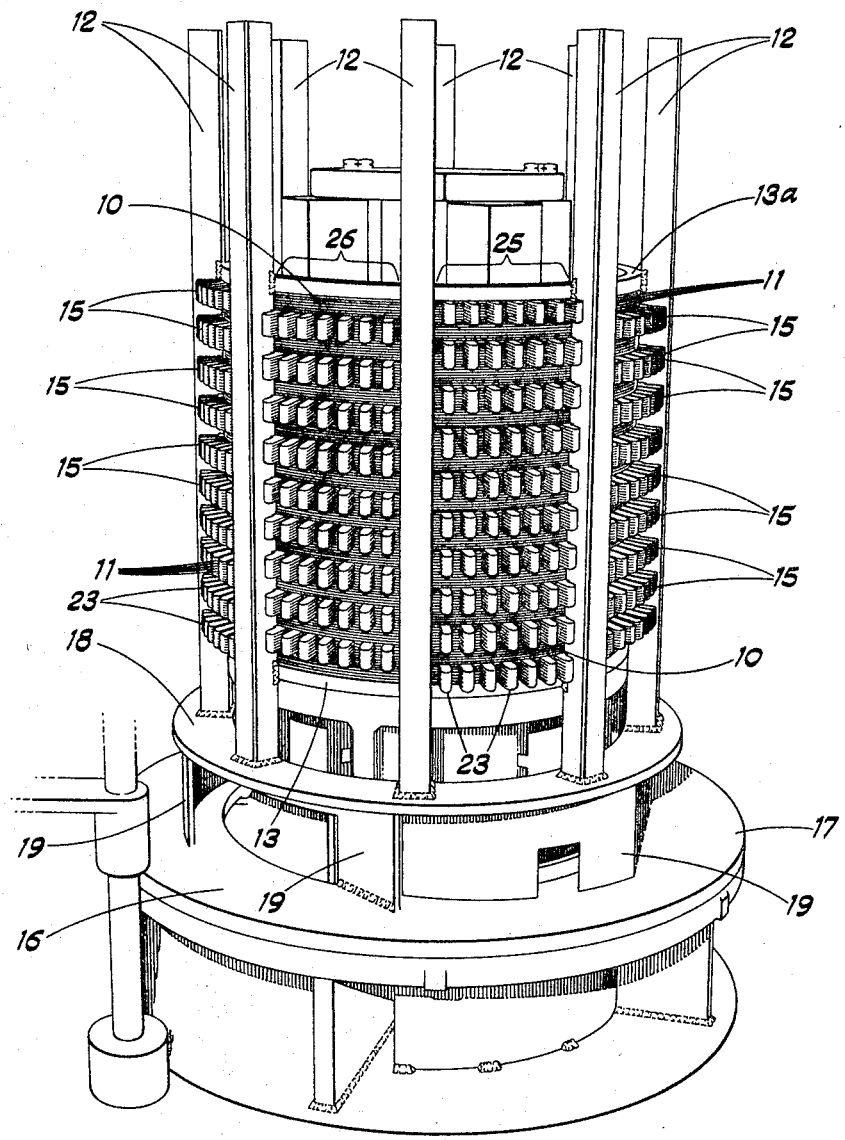
FIGURE 2 is a perspective view of the stator core appearing in FIGURE 1.

In FIGURES 1 and 2 there is shown a stator core 10 for a dynamoelectric machine, and some of the structural members used for supporting the core in the stator frame. This core consists of a tubiform stack of flat laminations 11 aligned axially between eight frame ribs 12 spaced at equal intervals around the stack axially thereof, and clamped between a pair of end rings 13, 13a secured to the frame ribs. End ring 13 is shown in FIGURE 1 and 13a in FIGURE 2. The core has an inner cylindrical surface interrupted by winding slots which extend axially of the core and radially thereinto, and an outer cylindrical surface interrupted by projections 15 but otherwise coaxial with the inner surface.

The stator illustrated is for a small synchronous A-C generator end mounted on an engine by means of frame structure 16. Structure 16 has a wide flange 17 adapted for bolting to the engine, an inner flange 18 on which frame ribs 12 are supported, and a number of vanes 19 separating the two flanges and defining passages through which cooling air is expelled from the generator. A wrapper 20 placed around the core over ribs 12 and projections 15 defines with the core and ribs eight axial passages 21 interrupted by the projections. Hence, the air flowing through passages 21 will be turbulent because the projections are staggered so as to break up straight line flow. This results in a marked improvement of heat transfer from the core to the air. A fan on the rotor of the machine located inside structure 16 draws air through the machine from the other end thereof and expels it through the passages between vanes 19. This air passes axially through the mahine along two parallel paths, one, between the poles of the salient pole rotor, and the other, through passages 21. A cover constructed for admitting air to the machine is placed over the open end of the stator.

Figure 3:
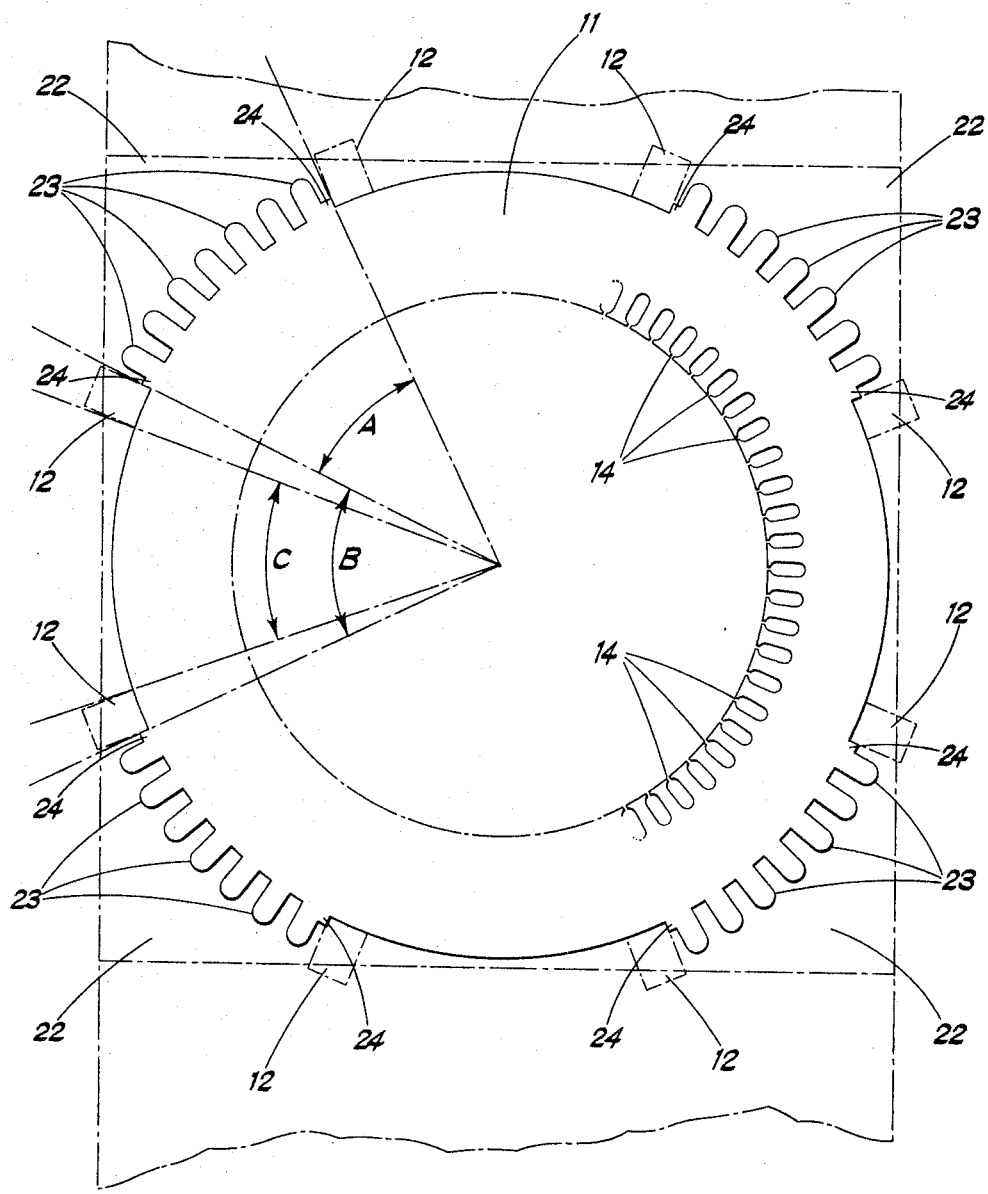
FIGURE 3 is a plan view of the individual laminations of the core stack shown in FIGURE 2.

Core 10 is a stack of identical laminations 11 of the configuration shown in FIGURE 3. Lamination 11 is punched from strip in such a way that four groups of projections 23 come from the four corners 22 of a square pattern, and since these corners are otherwise scrap, the lamination is produced from sheet stock of the same size as required for a similar lamination without the projections. Consequently, this lamination configuration costs no more in material and very little more in tooling. The outer edge of lamination 11 is a circle with four groups of projections thereon. These projections are alike and equally spaced one from another in four groups which are also equaly spaced on the circle. A small tab 24 at the ends of each group serve as means for locating the lamination on the frame ribs. As illustrated in FIGURE 3 the plain edge portions and the edge portions with projections on them alternate on the circle. Each group of six projections 23 along with their two tabs 24 extend over an arc of angle A, and each plain edge portion over an arc of angle B. Allowing for manufacturing tolerances, angle A is made equal to angle C, and angle B equal to angle C plus twice the angle subtended by a frame rib 12. This angular relationship is necessary if the laminations are to be stacked between equally spaced rib frames in the way to be described later. It can be readily seen from FIGURE 3 that each arc with projections thereon subtends an angle less than 45° by the angle subtended by a frame rib, and that each plain arc subtends an angle greater than 45° by the angle subtended by a frame rib.

Laminations 11 are stacked in packages of a number of laminations per package with the tabs and projections in alignment. Hence, the periphery of each package has the same configuration as the individual laminations. Moreover, all the packages are alike as are the laminations. The packages are stacked one upon another with each package rotated 45° in the core stack relative to the adjacent packages as illustrated in FIGURE 2. From this figure it will be seen that the package at the very top of the core stack has projections in regions 25 and none in region 26, the next package down has no projections in region 25 and projections in region 26, the third package down has projections in region 25 and none in region 26, and so on down through the stack. It will be noted also that every other region between a pair of adjacent frame ribs is like region 25 and that the remaining inbetween regions are like region 26. Hence, the air flowing through any one of the passages 21 passes alternately through a row of projections and over a plain surface. This improves the heat transfer from the core to the air in two ways: one, it causes turbulence in the air; two, it increases the surface area exposed to the turbulent air.

Although the description of this invention is directed to the specific core structure shown in the drawings, the scope of the invention is not intended to be so limited. The number, size, shape, distribution, arrangement, etc., of the projections can be varied in the practice of the invention and yet the advantage of improved heat transfer realized at no increase in material costs and very little increase in tooling costs. In summary, the projections which cause the turbulence in the air and increase the surface area of the core in contact with the turbulent air are obtained from material which would otherwise be scrap.

What we claim as new and desire to secure by Letters Patent of the United States is:

1. A stator core for a dynamoelectric machine comprising a stack of identical laminations arranged in packages of a plurality of laminations per package, each lamination having a generally circular periphery with four like groups of projections superposed on the circle in equally spaced relation and with each group having a number of projections spaced one from another over not more than one eighth of the periphery, all the laminations in each package having their projections in register, and the projections of each package being offset angularly 45° with respect to the corresponding projections of adjacent packages whereby over at least the major portion of the peripheral surface of the core the groups of projections alternate with plain surface area.

2. A stator core for a dynamoelectric machine comprising a stack of identical laminations arranged in packages of a plurality of laminations per package, each lamination having a generally circular periphery with four identical groups of projections superposed on the circle in equally spaced relation and with each group having an equal number of like projections spaced equally one from another over less than one eighth of the periphery, all the laminations in each package having their projections in register, and the projections of each package being offset angularly 45° with respect to the corresponding projections of adjacent packages whereby the peripheral surface of the core has an alternate arrangement of eight relatively narrow axial strips free from projections and eight relatively broad axial strips with projections in every other package and with these projections aligned axially of the core.

3. The stator core defined by claim 2 wherein a frame rib is located against the core axially thereof in each one of the eight relatively narrow axial strips free from projections, and the laminations of the core are clamped between a pair of end rings which are secured to the frame ribs.

4. A laminated core for a dynamoelectric machine comprising a plurality of laminations in the core stack including at least one annular lamination having an inner circular periphery with winding slots extending into said lamination from said inner periphery and having an outer circular periphery concentric with the inner periphery, four like groups of projections superposed on the circle of said laminations, said projections in each group being spaced apart and said groups of projections being spaced equally on the circle and extending over an arc of the circle of less than 45°.

References Cited
UNITED STATES PATENTS

| | | | |
|---|---|---|---|
| 2,695,969 | 11/1954 | Yates | 310—259 |
| 2,774,000 | 12/1956 | Ross | 310—259 |
| 3,187,211 | 6/1965 | Ve Nard | 310—254 |

WARREN E. RAY, *Primary Examiner.*

R. SKUDY, *Assistant Examiner.*

U.S. Cl. X.R.

310—60